(12) United States Patent
Dong et al.

(10) Patent No.: US 7,574,685 B1
(45) Date of Patent: Aug. 11, 2009

(54) METHOD, SYSTEM, AND ARTICLE OF MANUFACTURE FOR REDUCING VIA FAILURES IN AN INTEGRATED CIRCUIT DESIGN

(75) Inventors: Xiaopeng Dong, San Jose, CA (US); Inhwan Seo, Fremont, CA (US); William Kao, Fremont, CA (US); David C. Noice, Palo Alto, CA (US); Gary Nunn, Los Gatos, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 177 days.

(21) Appl. No.: 11/739,622

(22) Filed: Apr. 24, 2007

Related U.S. Application Data

(60) Provisional application No. 60/794,650, filed on Apr. 24, 2006.

(51) Int. Cl.
*G06F 17/50* (2006.01)
(52) U.S. Cl. .............................. 716/11; 716/5
(58) Field of Classification Search ........................ None
See application file for complete search history.

(56) References Cited

U.S. PATENT DOCUMENTS

| | | | |
|---|---|---|---|
| 5,984,510 A * | 11/1999 | Guruswamy et al. ........... 716/2 |
| 6,305,000 B1 * | 10/2001 | Phan et al. ..................... 716/5 |
| 6,499,135 B1 * | 12/2002 | Li et al. ........................ 716/19 |
| 6,832,360 B2 * | 12/2004 | Li .................................. 716/5 |
| 6,883,149 B2 * | 4/2005 | Li et al. ......................... 716/4 |
| 6,895,568 B2 * | 5/2005 | Li ................................. 716/10 |
| 7,007,258 B2 * | 2/2006 | Li .................................. 716/9 |
| 7,096,447 B1 * | 8/2006 | Li et al. ........................ 716/11 |
| 7,200,831 B2 * | 4/2007 | Kitabayashi .................. 716/13 |
| 7,231,624 B2 * | 6/2007 | Vuong et al. .................. 716/12 |
| 7,240,314 B1 * | 7/2007 | Leung ............................ 716/8 |
| 7,275,222 B2 * | 9/2007 | Douriet .......................... 716/1 |
| 7,308,669 B2 * | 12/2007 | Buehler et al. ................ 716/13 |
| 7,328,419 B2 * | 2/2008 | Vuong et al. .................. 716/11 |
| 7,398,489 B2 * | 7/2008 | Dinter et al. ................... 716/4 |
| 2006/0123367 A1 * | 6/2006 | Sakurabayashi ............... 716/5 |

\* cited by examiner

*Primary Examiner*—Leigh Marie Garbowski
(74) *Attorney, Agent, or Firm*—Vista IP Law Group, LLP.

(57) ABSTRACT

An improved method, system, and article of manufacture for reducing via failures is described. In one approach, additional vias or via cuts are inserted into an IC device to increase the number of cuts in a given area. The additional vias or via cuts are inserted until a sufficient via density level has been reached.

24 Claims, 12 Drawing Sheets

METHOD, SYSTEM, AND ARTICLE OF MANUFACTURE FOR REDUCING VIA FAILURES IN AN INTEGRATED CIRCUIT DESIGN

CROSS-REFERENCE TO RELATED APPLICATIONS

The present application claims the benefit of U.S. Provisional Application No. 60/794,650, filed Apr. 24, 2006, which is hereby incorporated by reference in its entirety.

BACKGROUND AND SUMMARY

The invention relates to the design and manufacture of integrated circuits.

An integrated circuit (IC) is a small electronic device typically formed from semiconductor material. Each IC contains a large number of electronic components that are wired together to create a self-contained circuit device. The objects on the IC are materialized as a set of geometric shapes that are placed and routed on the chip material. During placement and routing, the location and positioning of each geometric interconnect shape is identified and added to the design.

The IC design typically contains multiple layers of materials. Cut layers for an integrated circuit design are the metal plugs that connect two metal routing layers. Cut shapes must be connected to metal above and below the cut on the IC. This sandwich of two metal pieces and the cut (metal connecting the two shapes) is commonly called a "via."

One goal of modern IC design is to minimize the occurrence of via failures in the manufactured IC product. Numerous types of via failures may occur during manufacturing. For example, a defect may be created during the manufacturing/fabrication process that physically causes an open circuit at the physical location of the via, e.g., the via may not be fully formed or sufficiently formed between the two layers of metal. This type of defect may cause the IC product to fail its intended operation or operate in a diminished capacity.

One conventional approach for addressing via failures is to utilize redundant vias in the IC design. The placement and routing steps for an IC design typically inserts a single cut via at each location requiring a connection between two metal layers of the design. Instead of using single cut vias, redundant vias can be used instead. This can be implemented in several different ways. One example approach is to add additional adjacent cuts at each single cut via location, thereby resulting in multiple single-cut vias that together form a multi-cut via, where the additional cuts provide redundancy in the event of a failure at the first cut. Another approach is to replace each single-cut via with a multi-cut via from a library of such multi-cut vias. In either approach, the resulting multi-cut via must comply with design rule requirements sufficient to pass a DRC check.

One problem with this approach is that not all single-cut via locations are eligible to be replaced with a multi-cut via or to receive additional adjacent via cuts. This situation may exist, for example, if the original single-cut via is very near other objects in the layout, and the addition of any additional cuts would cause a violation of a spacing rule. Therefore, it is quite possible that many single-cut vias will remain the IC design, increasing the risk of a via failure.

Therefore, there is a need for an improved method and mechanism to address and minimize via failures.

According to some embodiments of the invention, additional vias are inserted into the device in order to increase the number of cuts in an area to achieve a minimum or preferred percentage for each cut layer of the device's process. The additional vias can be inserted away from, but nearby, the original vias in the design. The present approach can be applied to minimize defects for both single-cut as well as multi-cut vias.

Other and additional objects, features, and advantages of the invention are described in the detailed description, figures, and claims.

DETAILED DESCRIPTION

The present invention is directed to an improved method, system, and article of manufacture for inserting additional vias into an IC device to increase the number of cuts in a given area.

Figure 1:
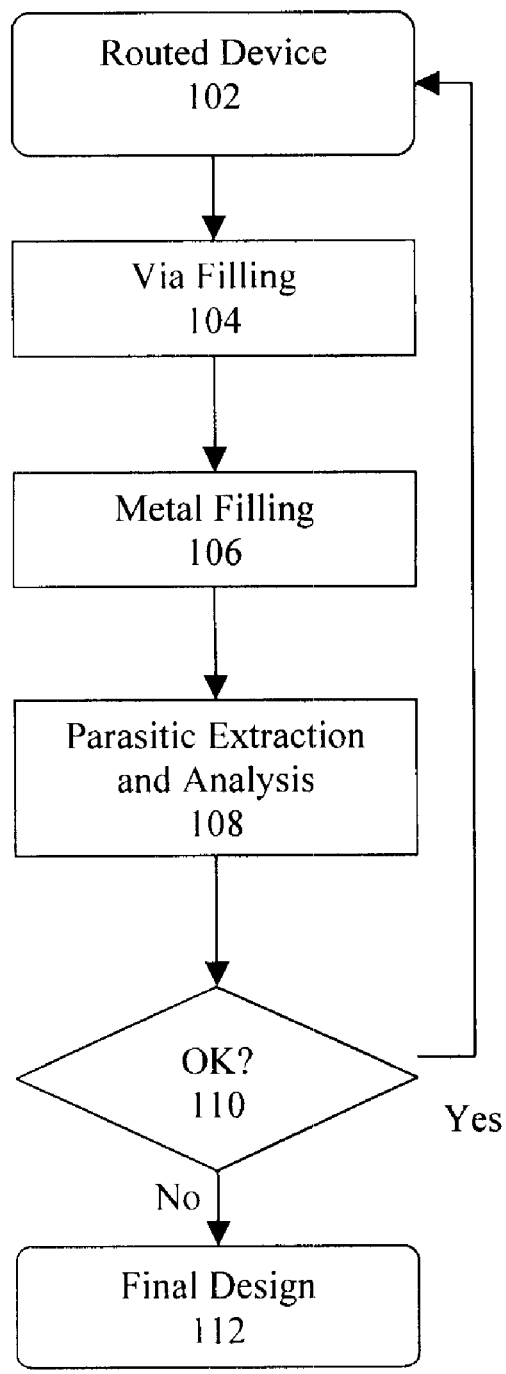
FIG. 1 shows a flowchart of a process for reducing via failures according to an embodiment of the invention.

FIG. 1 shows a process flow for a method of minimizing via defects in an IC design. At 102, the IC design is placed and routed to generate a routed design. Any suitable approach can be taken to place and route the IC design.

At 104, via filling is performed to insert additional one or more additional vias into the layout. This action increases the density of cuts in a given portion of the design. Similar to metal density requirements, cuts are made to meet a minimum density of cuts. The additional cuts can also be used to achieve a preferred density percentage for each cut layer of the device.

Unlike adding metal fill, which can be performed by looking at each relevant layer one layer at a time, inserting additional cuts must also be done while looking at the metal layers above and below the cut layer. This is because in one embodiment, cut density filling can not be implemented alone as processing requirements may require cuts to exist with metal both above and below the cut.

Additionally, checks must be made to ensure that the additional cuts do not negatively affect pre-existing geometries already on the metal layers. For example, if a cut is placed between two layers that already have signal routing, a short would be caused. Therefore, in one embodiment, the process for addressing cut density issues is modeled as a "via fill" task, in which via cells are added to the design, not just a "cut fill" task.

In an alternate embodiment, the additional cuts can be added even if metal does not exist both above and below the cut. In this alternative embodiment, the term "via fill" refers to the additional cut, even if it does not technically result in a via since two metal layers are not being connected. However, the additional cut in this embodiment contributes to the via fill density requirements. The advantage of this approach is that this provides more candidate locations to insert a "via" fill, since less pre-existing metal layer geometries need be considered to avoid problems.

In some embodiments of the invention, the additional vias can be added to the following locations:

1) The vias can be added in areas where metal fill shapes would intersect with existing nets on consecutive layers, e.g., power/ground or signal nets; and/or 2) The vias can be added in areas where metal fill shapes on consecutive layers will not intersect.

Vias are added as needed until either a preferred density or minimum density is reached. The use of preferred density creates a more uniform result than relying only on minimum density requirements. In an alternate embodiment, a minimum density requirement is established, and vias are added until the minimum density is reached.

Multi-cut vias can be used for the additional vias. In some cases, using multi-cut vias can help in reducing the amount of via fills to be added to meet preferred or minimum cut densities.

The act of inserting additional cuts into a design can be performed using processes similar to methods used for inserting dummy metal fill shapes into an IC design. Metal fill insertion is a process requirement for all modern processes, e.g., ones that use Chemical Mechanical Planarization (CMP). CMP has emerged as an important technique for planarizing dielectrics because of its effectiveness in reducing local step height and achieving a measure of global planarization not normally possible with spin-on and resist etch back techniques. However, CMP processes have been hampered by layout pattern dependent variation in the inter-level dielectric (ILD) thickness which can reduce yield and impact circuit performance. Dummy metal fill patterning is a common approach for reducing layout pattern dependent dielectric thickness variation. Metal-fill patterning is the process of filling large open areas on each metal layer with a metal pattern to compensate for pattern-driven variations. The manufacturer of the chip normally specifies a minimum and maximum range of metal that should be present at each portion of the die. If there is an insufficient amount of metal at a particular portion or "window" on the chip, then metal-fill is required to increase the proportion of metal in that portion or window. Otherwise, an insufficient amount of metal may cause bumps to exist in the finished chip. One example approach for inserting metal fill is described in co-pending U.S. application Ser. No. 10/300,722, filed on Nov. 19, 2002, which is hereby incorporated by reference in its entirety.

At 106, dummy metal fill is added to the IC design. In some embodiments, the action 106 to add dummy metal fill is performed after the action 104 to add via fill, to ensure greater availability of locations to add via fill so that all or most candidate locations are not preemptively taken by metal fill.

At 108, once the metal fill objects have been sufficiently inserted to meet density requirements, parasitic extraction and analysis is performed. If the parasitic extraction and analysis action detects a problem, e.g., a timing problem, then the process returns back to 102 to re-route the design to correct the problem.

In one embodiment, an ECO change process may be initiated to correct the timing problem. In this approach, ECO placement, routing actions, and optimization are performed. Placement action involves incremental placement of added instances of cells in the design while ignoring the existence of the metal fill or via fill geometries. Routing action involves incremental routing of the added and modified nets in the design while also ignoring the existence of the metal fill and via fill geometries. It is noted that these actions are performed by ignoring any design errors or rule violations that may be caused by the existing metal fill or via fill geometries. Optimization is also performed while ignoring existing metal fill and via fill objects. Next, the process performs metal fill repairs, if any are necessary, to correct design violations and errors that may have resulted from the placement, routing, and optimization actions. Incremental repairs are performed, for example, to correct shorts and DRC violations, such as by trimming away or removing existing metal fill or via fill geometries that cause the short or DRC violation. In addition, in portions of the layout where original signal geometries were removed due to deletions in the ECO process, dummy metal fill or via fill can be added to get those areas back to the desired density, e.g., for portions of the design in which signal routing has been removed. Additional parasitic extraction and analysis may be performed to check the suitability of the layout and metal fill changes caused by the ECO and fill repair actions. If so, then, the process may proceed back to repeat the process actions again. Further information regarding an example ECO process that may be utilized in conjunction with the present invention is described in co-pending U.S. application Ser. No. 11/069,759, filed on Feb. 28, 2005, entitled "Method and System for Implementing Metal Fill," which is hereby incorporated by reference in its entirety.

At 112, the final design is generated. In some embodiments, a one pass approach is used to implement the metal fill and via fill. In the one pass approach, the metal and via fill are added without requiring an additional loop from 110 to repair timing or other problems.

Figure 2:
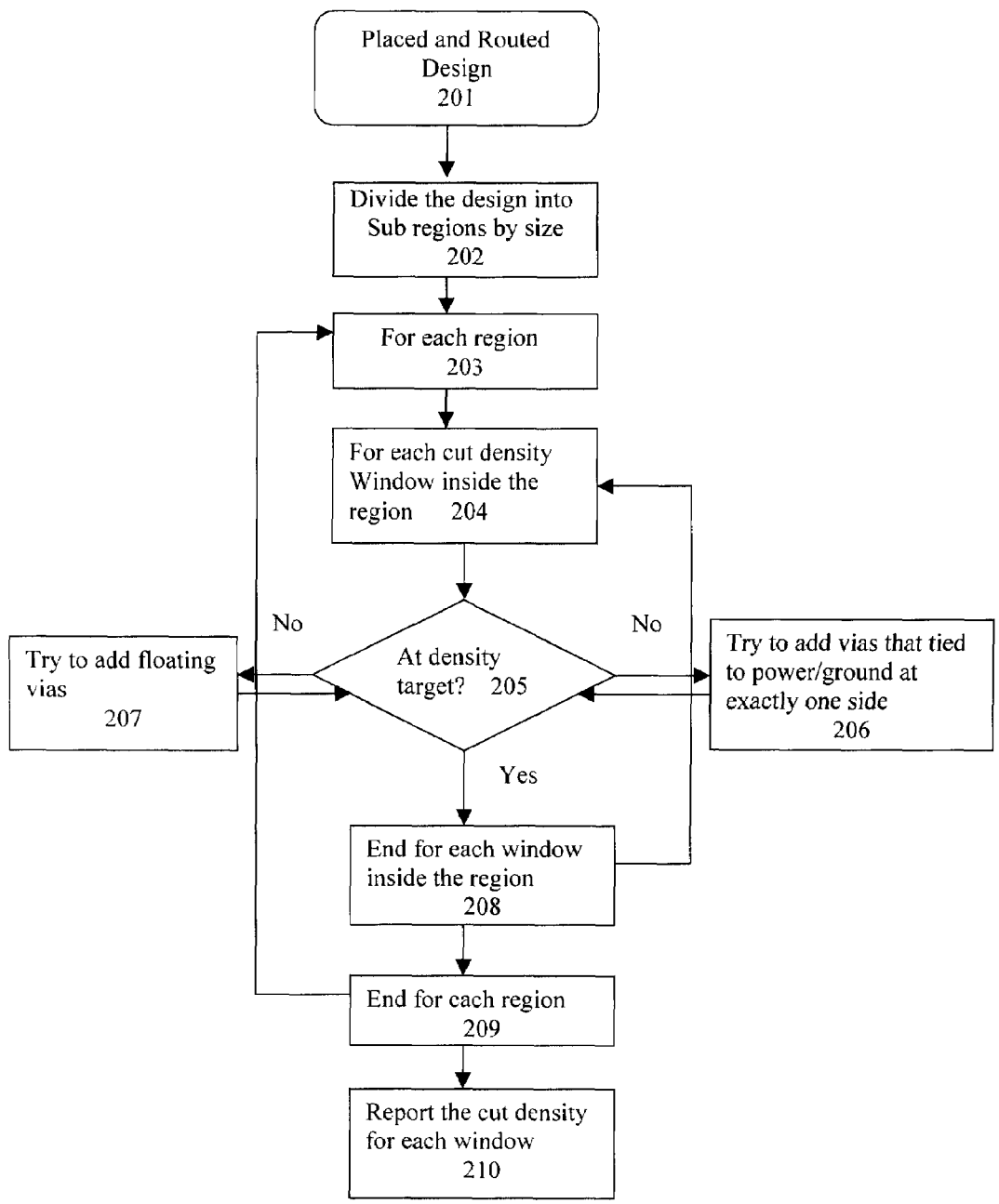
FIG. 2 shows a flowchart of a process for implementing via fill according to an embodiment of the invention.

FIG. 2 is a flow chart showing a process to implement via filling based on cut density requirements according to some embodiments of the invention. At 201, a placed and routed design is received and input to the process. At 202, the target die area is divided into sub regions by size. Any suitable size may be utilized for action 202, depending upon processing and equipment requirements for implementing the process. A loop occurs at 203 to begin processing for each region.

At 204, the process begins processing for each "cut density window" in the region. A cut density window corresponds to a window that is established to check for sufficient cut density within a particular section of the design. As noted above, the cut density window can be checked for either or both minimum density or preferred density. In some embodiments, the cut density windows are non-overlapping. In other embodiments, the cut density windows are overlapping.

A determination is made at 205 whether the cut density of the cut density window meets the cut density requirement. If the cut density requirements for the window are met, then the process returns back to 204 to process another cut density window.

If the cut density requirements are not met, then one or more additional vias are added. In some embodiments, there are two types of vias that are added to solve the cut density problem:

1) Floating: both of the top and bottom metal layers of the via are not connected to another object/net in the device 2) Non-Floating: one of the two metal layers is connected, for example, to a power/ground net or a signal net.

Candidate locations are identified for which it is eligible to add the via fill. The candidate locations are then added to the design as via fill until the preferred or minimum density requirements are met.

The process for determining candidate locations for floating vias to be inserted involves comparing two consecutive routing layers and looking for open areas that are common to both layers. This process can be accomplished by performing a logical NOR operation between the shapes on the two metal layers. A fence is drawn around existing geometries to establish a buffer zone so that vias are not added too close to existing geometries. The remaining locations identified from performing the NOR operation are candidate locations for inserting via fill, either as single cut vias or multi-cut vias. In some embodiment, multi-cut vias are preferred over single-cut vias, since this approach allows the same or greater number of via cuts while also requiring insertion of a lower number of via instances.

In some embodiments, the candidate via locations can be ordered based upon an estimate of effects upon the design, e.g., timing effects or proximity to existing vias. Some candidate via locations may have better or worse expected effects upon the design than other candidate via locations. The candidate via locations are ordered from best location to worst locations, with candidate via locations from the better location used to add via fill until fill density requirements have been met.

The process for determining candidate locations for non-floating vias to be inserted involves comparing two consecutive routing layers and looking for open areas on one layer and nets on the other that are common. The net, e.g., tie-off net, that is common may be any type of net, including power/ground nets or signal nets. In some embodiments, it is preferred to only establish via fill corresponding to power/ground nets to avoid timing closure issues.

This process can be accomplished by performing a logical XOR operation between the power/ground or signal geometries on the two metal layers with other geometries on the metal layers. A fence can be established around existing vias and other metal layer shapes to establish a buffer zone. The remaining locations identified from performing the XOR operation are candidate locations for inserting via fill, either as single cut vias or multi-cut vias.

As with the floating vias, the candidate via locations can be ordered based upon an estimate of effects upon the design, e.g., timing effects or proximity to existing vias. The candidate via locations are ordered from best location to worst locations, with candidate via locations from the better location used to add via fill until fill density requirements have been met.

In some embodiments, the non-floating vias are added first to try and establish the density requirements, prior to adding the floating vias. In this approach, if cut density requirements are not met, then the process attempts at 206 to add one or more non-floating vias that has one metal side attached to either power or ground structures. The cut density for the cut window is updated and checked at 205 to determine if the cut density requirements have been met. If not, and no candidate non-floating via locations now exist, then the process attempts at 207 to add floating vias with two metal sides are all floating in empty spaces. The cut density for the cut window is updated and checked at 205 to determine if the cut density requirements have been met.

In alternate embodiments, the prioritization of candidate via locations is based upon an estimate of effects upon the design, e.g., timing effects or proximity to existing vias, with some candidate via locations having better or worse expected effects upon the design than other candidate via locations. The candidate via locations are ordered from best location to worst locations, without regard to whether the location is for floating or non-floating via fill, with the better candidate via locations used to add via fill until fill density requirements have been met. In some other embodiments, the floating vias are added first, prior to non-floating vias.

The via fill are added until the cut density requirement is met. In some embodiment, the processing continues for each window until the cut density requirement is met or until there is no additional valid location to add via fill. If the solution is unable to achieve the density requirement, then the process will get as close to it as possible. Error checking will flag any windows that do not meet minimum density requirements.

At 208, the process ends for a particular cut window and returns back to 204 to process another cut window. Once all cut windows have been process in a particular region, then at 209 the process ends for a particular region and returns back to 203 to process another region. Once all regions have been processed, the process proceeds to 210 to report the cut density for each window.

Figure 3:
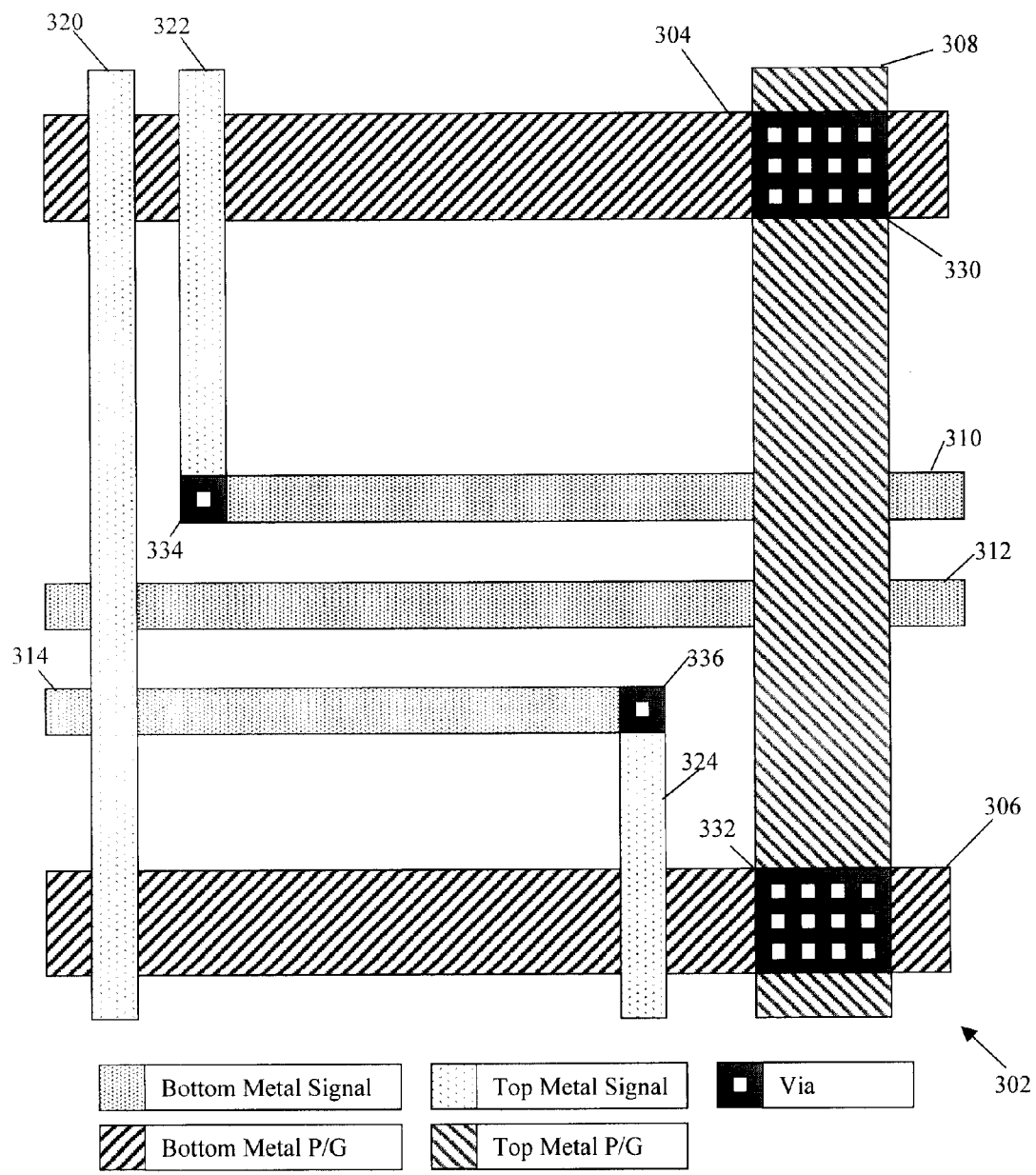
FIG. 3 illustrates an example window for an IC design

FIG. 3 illustrates an example window 302 within an IC design. Assume that this window 302 is a window within a larger region of a much larger overall IC design. Window 302 includes bottom layer power/ground geometries 304 and 306 as well as a top layer power/ground geometry 308. Multi-cut vias 330 and 332 connect bottom layer power/ground geometries 304 and 306 with top layer power/ground geometry 308.

Window 302 includes bottom metal layer signal geometries 310, 312, and 314. Window 302 also includes, top metal layer signal geometries 320, 322, and 324. A single-cut via 334 connects bottom metal layer signal geometry 310 with top metal layer signal geometry 322. Another single-cut via 336 connects bottom metal layer signal geometry 314 with top metal layer signal geometry 324.

Assume that a density requirement has been established for this window to reduce the possibility of failure for vias 334 and 336. The goal is to add additional via fill to window 302 such that the density requirement has been met.

Figure 4A:
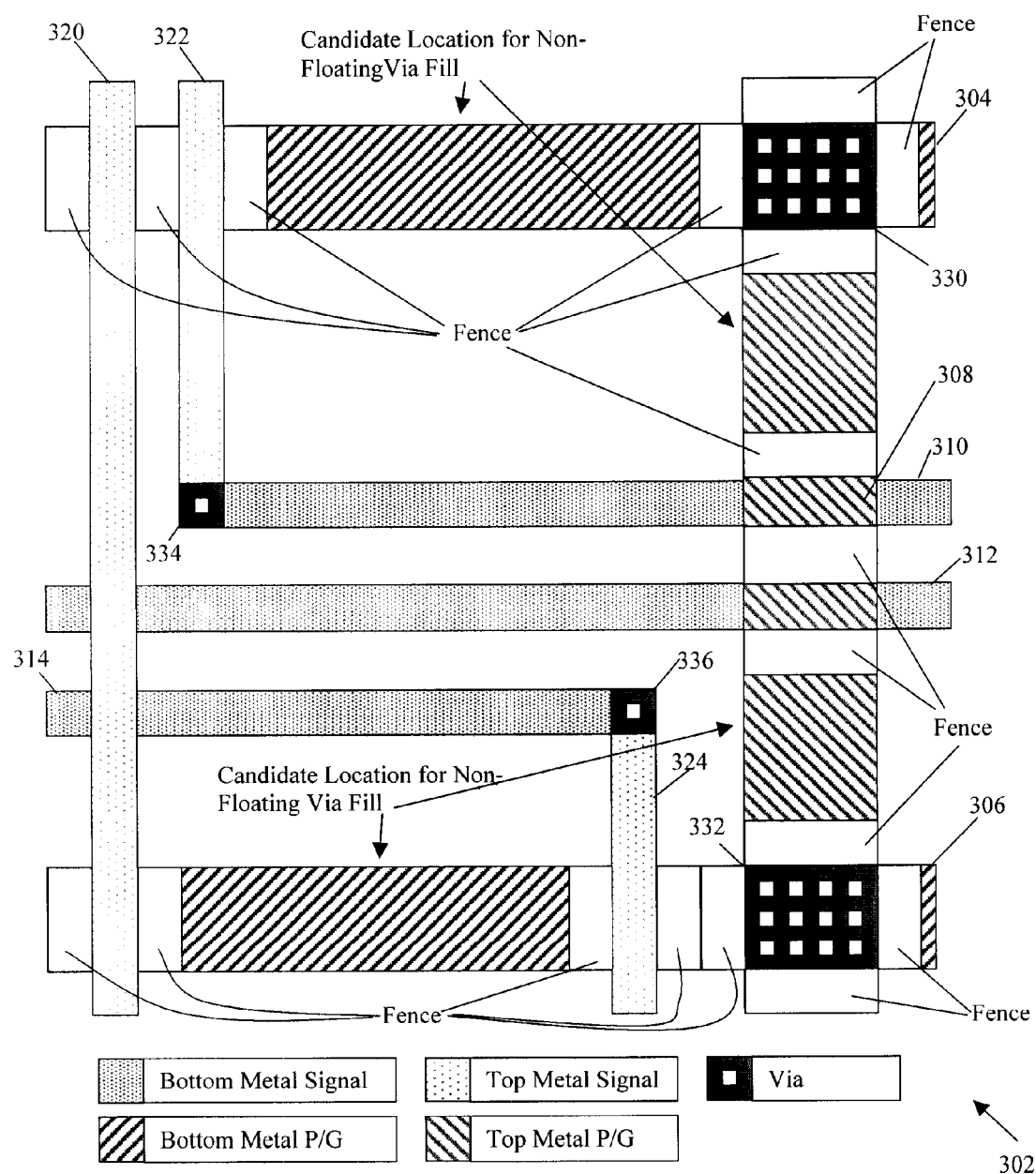
FIGS. 4*a-c* illustrates an approach for identifying candidate non-floating via fill for the window of FIG. 3.

One initial action is to identify the candidate locations for non-floating via fill. Referring to FIG. 4A, this action is determined by identifying the portions of the power/ground geometries that do not overlap any other vias or metal layer geometries for the layers of interest. In some embodiments, a fence area is created as a buffer zone that surrounds existing vias or metal layer geometries. The non-overlapping portions minus the fence portions form the candidate locations for inserting non-floating via fill. It can be seen in this example layout that four candidate locations have sufficient size, once the fence has been taken into account, to add via fill.

Figure 4B:
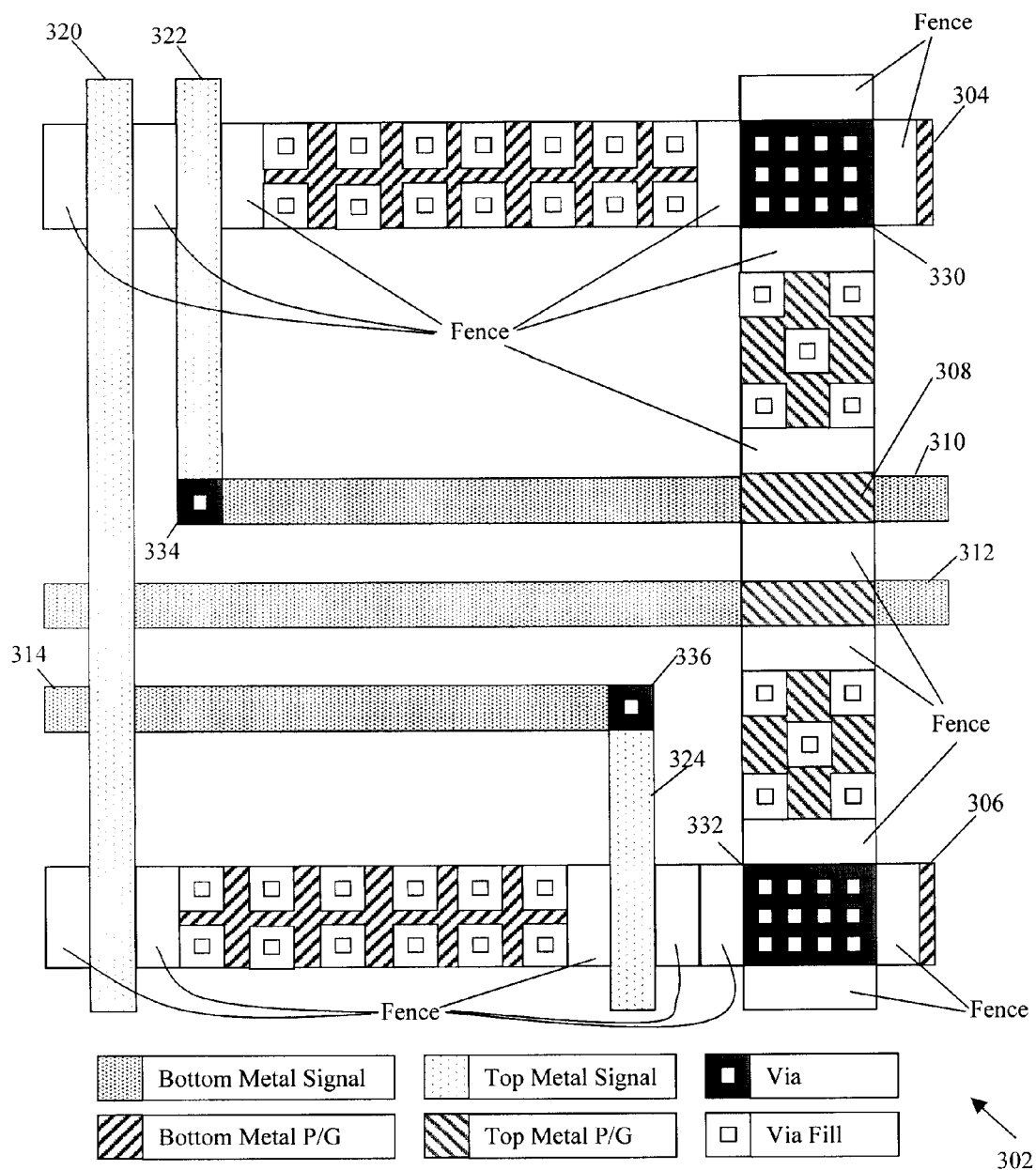
Figure 4C:
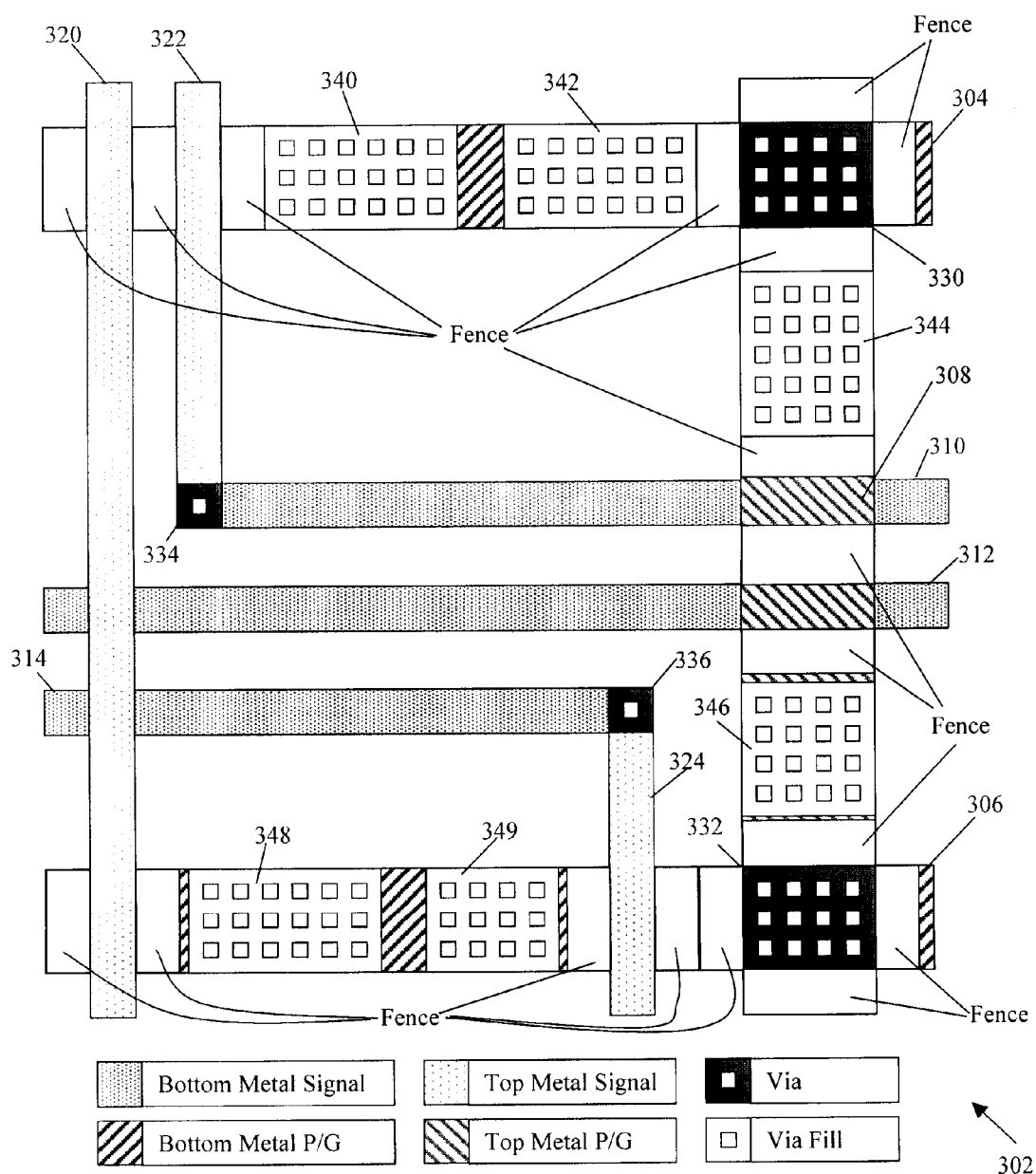

FIG. 4b shows example candidate single cut via fills that may be located in the four candidate via fill locations. FIG. 4C shows example candidate multi-cut via fills that may be located in the candidate locations. Here, candidate multi-cut via fills 340, 342, 344, 346, 348, and 349 are shown within the eligible location for via fills. If it is desired to use non-floating multi-cut vias to provide sufficient via density, then these non-floating candidate via fills are selected and inserted into the design until sufficient via density has been obtained. As noted above, in some embodiment, multi-cut vias are preferred over single-cut vias since this approach allows the same or greater number of via cuts while also requiring insertion of a lower number of via instances. Therefore, in these embodiments, the approach of FIG. 4c would be used instead of the approach of FIG. 4b.

Figure 5A:
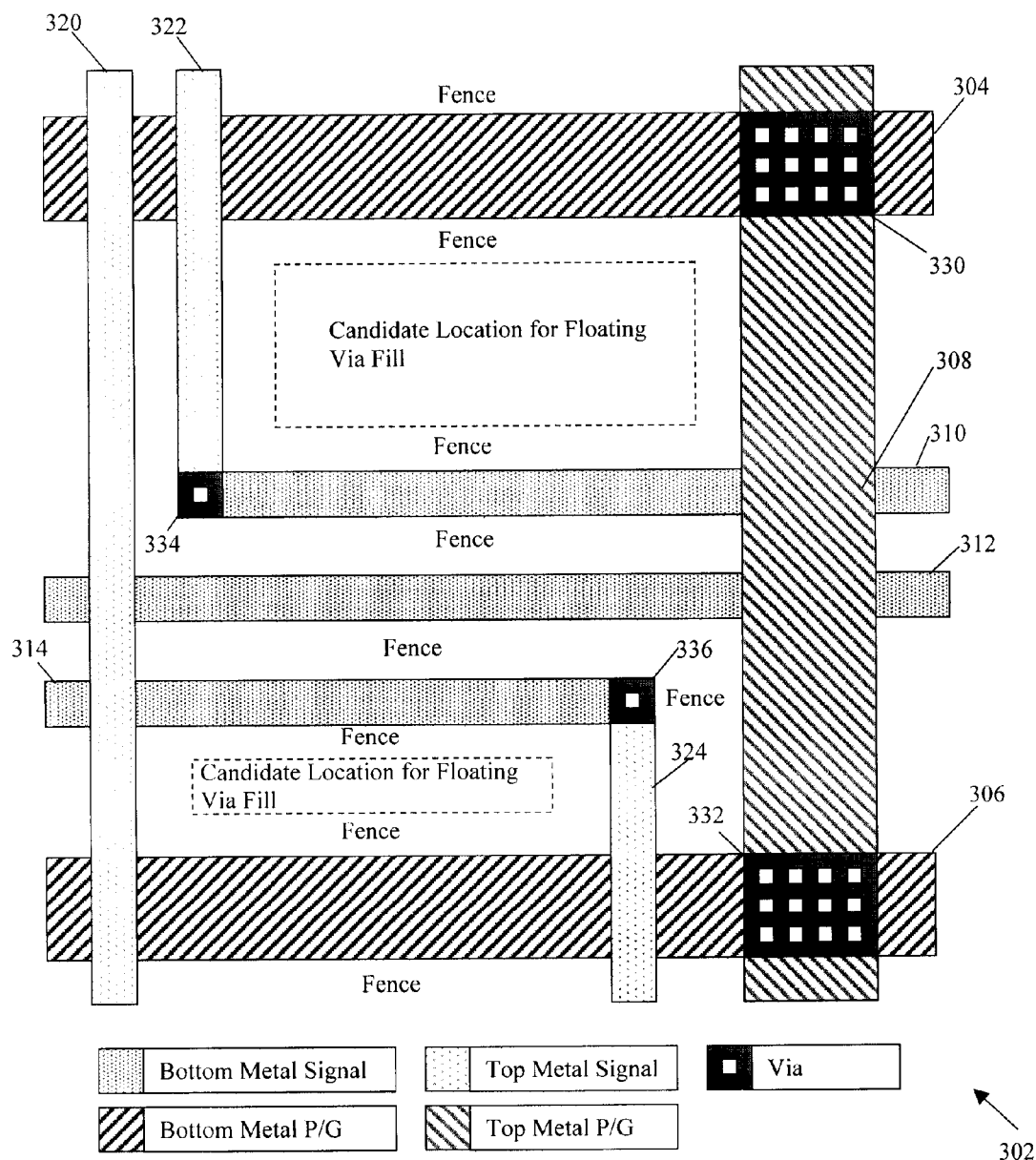
FIGS. 5*a-c* illustrates an approach for identifying candidate floating via fill for the window of FIG. 3.

Another action that can be taken is to identify the candidate locations for floating via fill. Referring to FIG. 5A, this action is determined by identifying the portions of the window 302 which do not include any existing geometries on either the top or bottom metal layers. In some embodiments, a fence area is created as a buffer zone that surrounds existing vias or metal layer geometries. The non-overlapping portions minus the fence portions form the candidate locations for inserting non-floating via fill. It can be seen in this example layout that only two locations have sufficient size, once the fence has been taken into account, to add via fill.

Figure 5B:
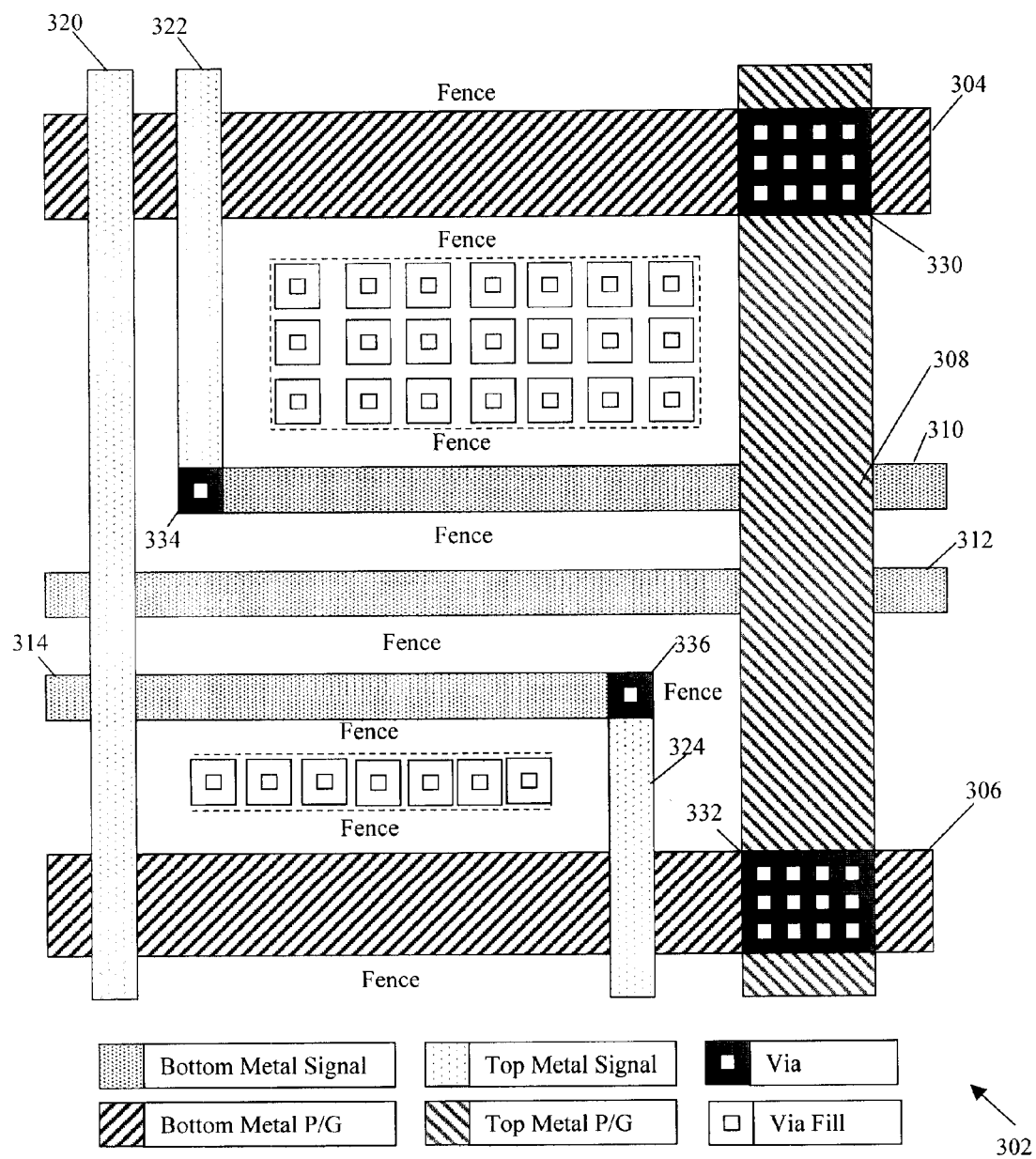
Figure 5C:
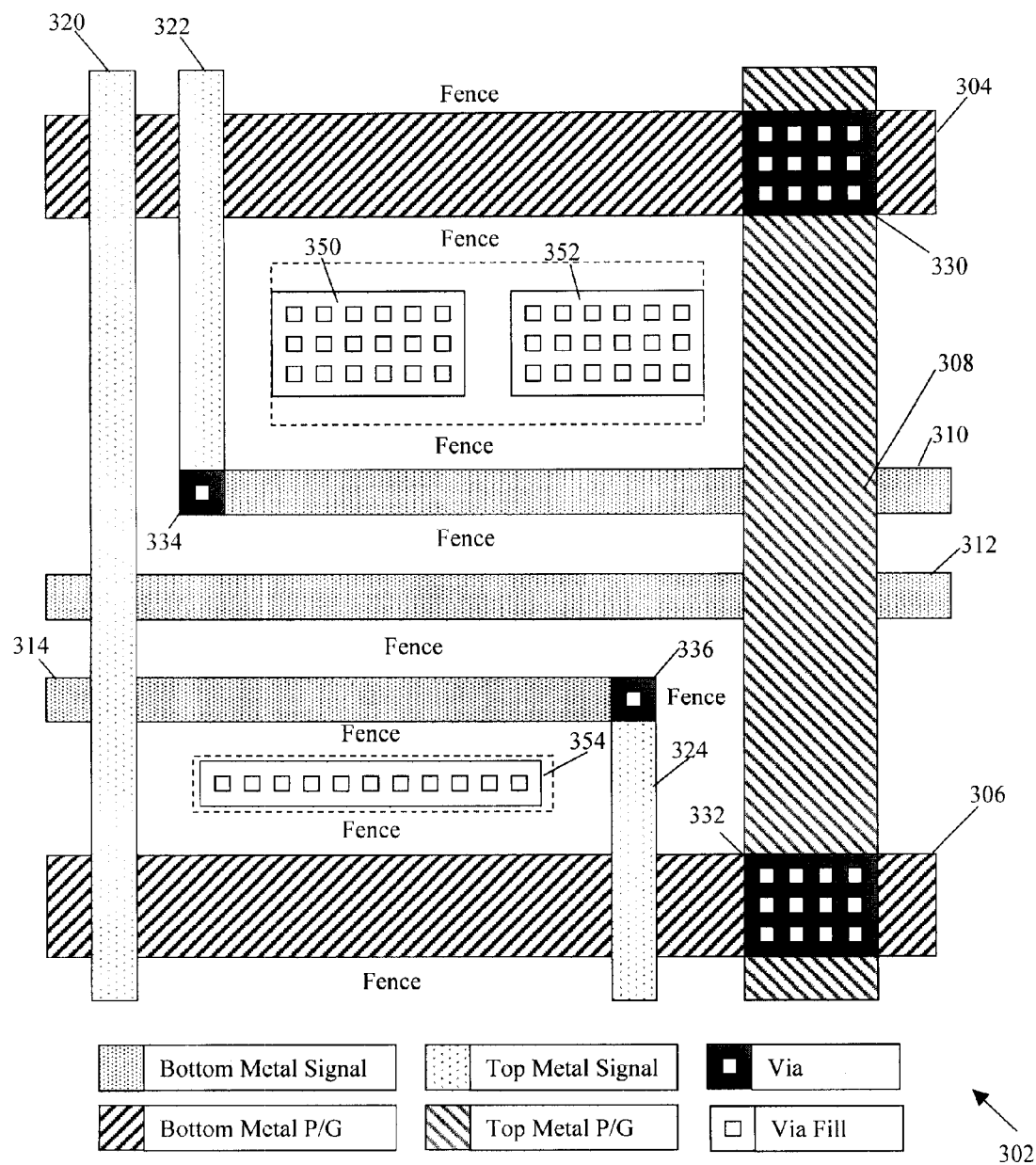

FIG. 5b shows example candidate single cut via fills that may be located in the candidate via fill locations. FIG. 5C shows example candidate multi-cut via fills that may be located in the candidate locations. Here, candidate multi-cut via fills 350, 352, and 354 are shown within the eligible location for via fills. If it is desired to use floating multi-cut vias to provide sufficient via density, then these candidate floating via fills are selected and inserted into the design until sufficient via density has been obtained. In the embodiments in which it is preferred to use multi-cut vias over single-cut vias, the approach of FIG. 5c would be used instead of the approach of FIG. 5b.

It is noted that the single cut and multi-cut via fills shown in FIGS. 4a-c and 5a-c are illustrative in nature, and other shapes and styles of via fill may be used as well, depending upon the particular purpose and goals to which the invention is directed. As such, the exact type, shape, and configuration shown in these figures are not intended to be limiting unless claimed as such.

Figure 6:
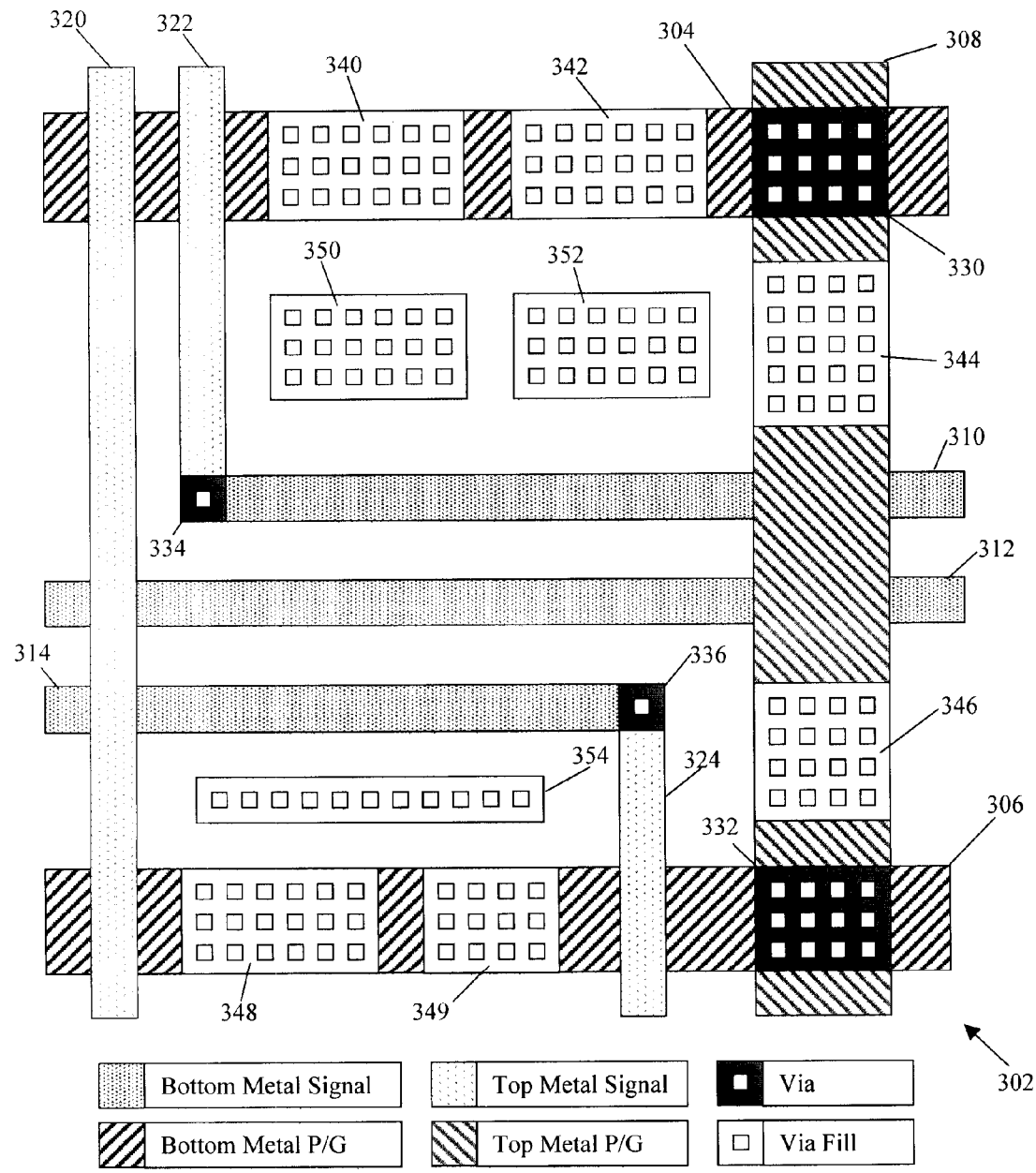
FIG. 6 shows the example window of FIG. 3 with inserted multi-cut via fill elements.

Once the candidate via fill elements have been identified, the next action is to insert the candidate via fill elements until the required via density levels have been obtained for window 302. One approach is to add each individual candidate via fill element on an element-by-element basis. The via density level is checked after insertion of each via fill element. If the required via density is not reached, another candidate via fill element is selected and inserted into the design. Here, assume that all the candidate floating and non-floating via fill elements from both FIGS. 4c and 5c are needed to establish sufficient via density levels. FIG. 6 shows window 302 after insertion of non-floating via fill elements 340, 342, 344, 346, 348, and 349 and floating via fill elements 350, 352, and 354.

Figure 7:
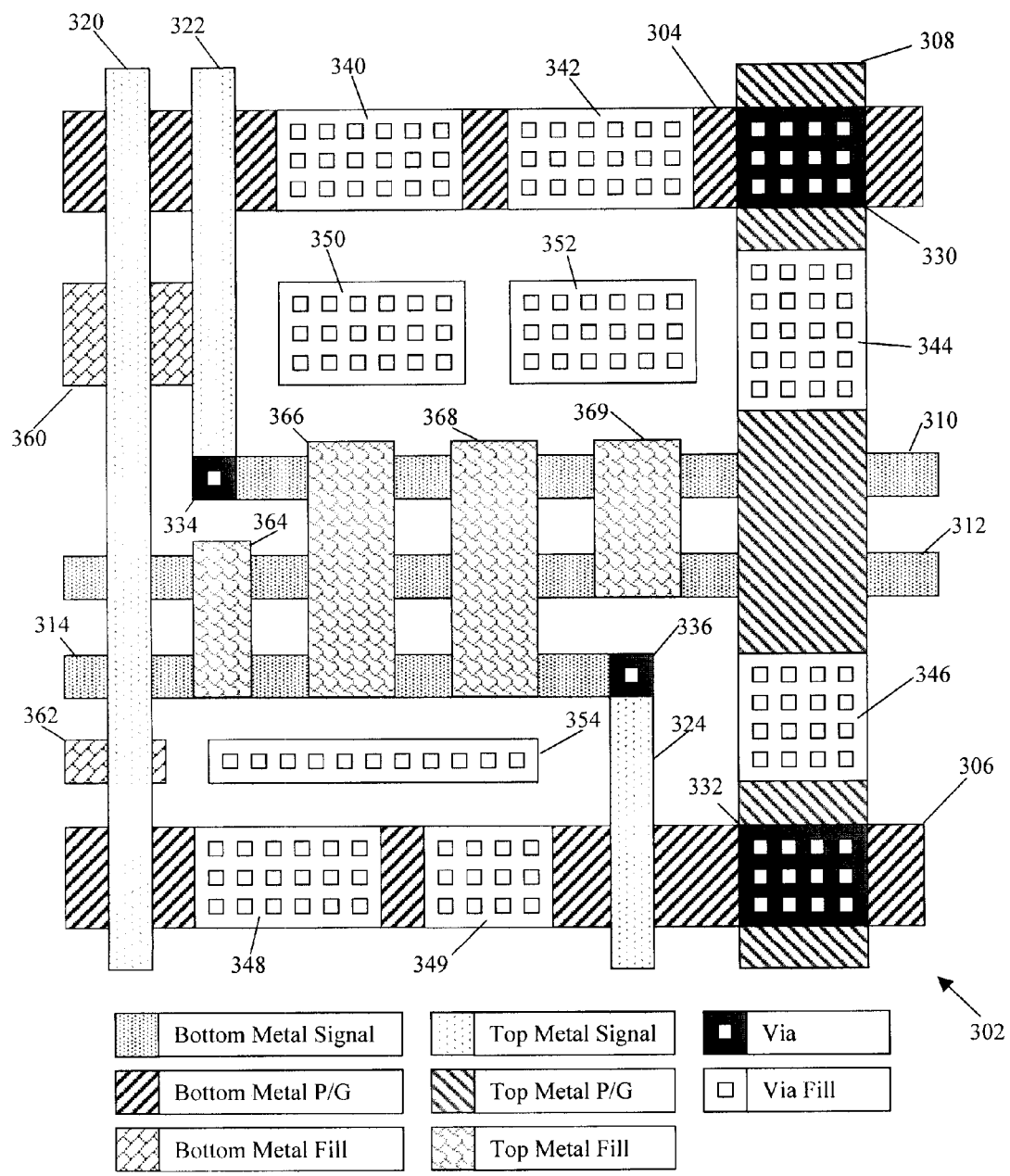
FIG. 7 shows the example window of FIG. 3 with inserted metal fill elements.

The next action is to add metal fill to the window. This action is taken to achieve sufficient metal fill density to meet minimum, preferred, or maximum metal fill density levels. Any suitable approach for inserting metal fill may be utilized in the invention. In an embodiment, the approach described in co-pending U.S. application Ser. No. 10/300,722, filed on Nov. 19, 2002, is employed to insert metal fill into window 302. FIG. 7 shows window 302 after insertion of metal fill elements 360 and 362 into the bottom metal layer and metal fill elements 364, 366, 368, and 369 into the top metal layer.

In conclusion, what has been described is an improved approach for reducing via defects in an IC design. Via fill elements are added to the IC design until via fill requirements have been achieved. The present solution can be integrated earlier into the design flow, which allows for the new vias to be included in parasitic extraction, analysis, and post-route ECO loops.

System Architecture Overview

Figure 8:
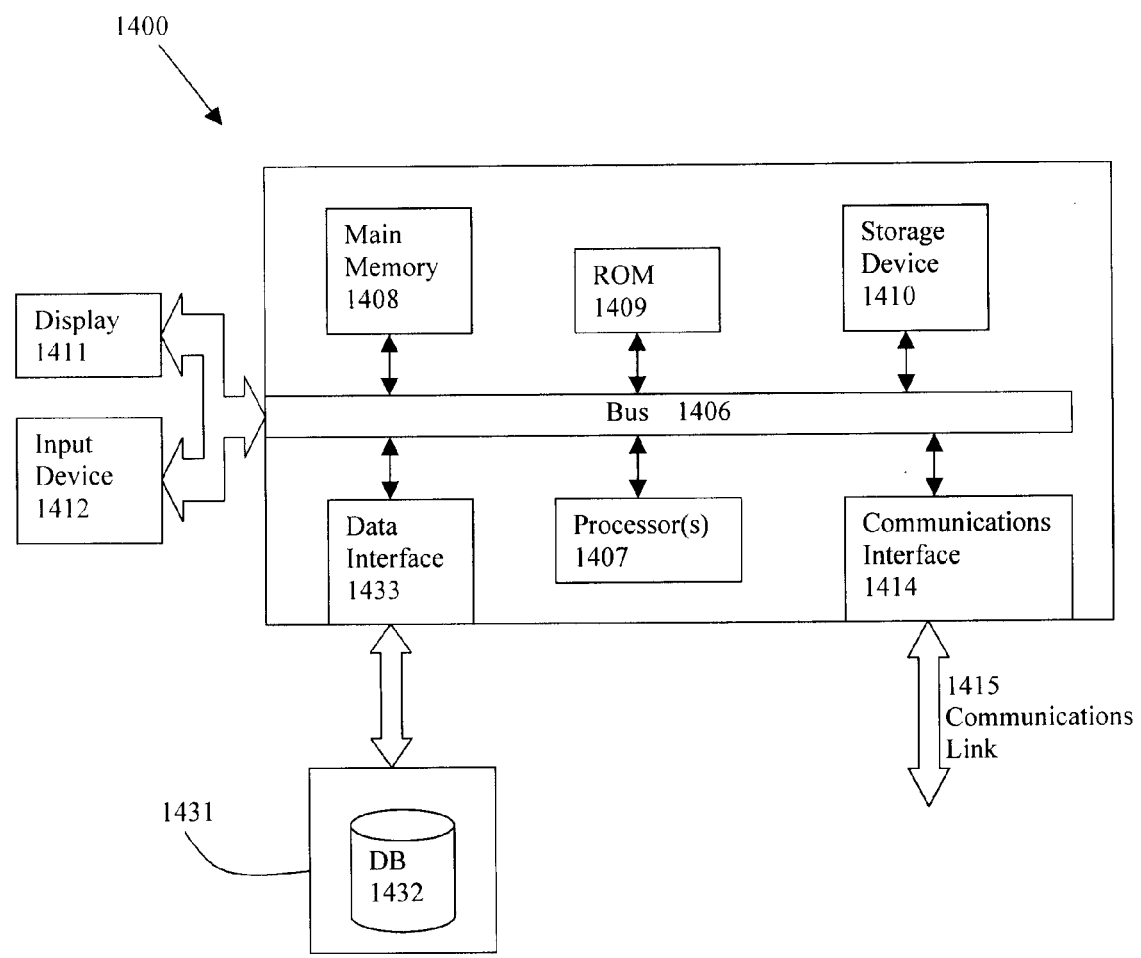
FIG. 8 shows architecture for implementing a metal-fill mechanism according to an embodiment of the invention.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for locating via fills comprising:
   establishing a window to check for a via filling parameter within a particular section of a design;
   determining whether the via filling parameter within the window meets a via filling parameter requirement;
   adding by a processor one or more additional via fills if the via filling parameter requirement is not met, wherein the act of adding the one or more additional via fills comprises adding additional vias to the design until a density requirement of cuts for the window has been met; and
   storing the added one or more additional via fills in a volatile or non-volatile computer readable medium or displaying the added one or more additional via fills on a display device.

2. The method of claim 1, wherein the one or more additional vias comprises floating and or non-floating vias.

3. The method of claim 2, further comprising identifying candidate locations eligible for adding the one or more vias until the via filling parameter requirement is met.

4. The method of claim 3, wherein the candidate locations for the floating vias are determined by comparing two consecutive routing layers and obtaining open areas that are common to both layers.

5. The method of claim 3, wherein the candidate locations are ordered based at least in part upon an estimate of effects upon the design.

6. The method of claim 3, wherein the candidate locations for the non-floating vias are determined by comparing two consecutive routing layers and obtaining open areas on one layer and nets on the other that are common.

7. The method of claim 2, wherein the non-floating vias are added to establish the via filling parameter requirement prior to adding the floating vias.

8. The method of claim 1, wherein the via filling parameter comprises a cut density or a spacing distance.

9. An apparatus for locating via fills comprising:
   means for establishing a window to check for a via filling parameter within a particular section of a design;
   means for determining whether the via filling parameter within the window meets a via filling parameter requirement; and
   a processor for adding one or more additional via fills if the via filling parameter requirement is not met, wherein the act of adding the one or more additional via fills comprises adding additional vias to the design until a density requirement of cuts for the window has been met; and
   a volatile or non-volatile computer readable medium for storing the added one or more additional vias or a display device for displaying the added one or more additional vias.

10. The apparatus of claim 9, wherein the one or more additional vias comprises floating and/or non-floating vias.

11. The apparatus of claim 10, further comprising means for identifying candidate locations eligible for adding the one or more vias until the via filling parameter requirement is met.

12. The apparatus of claim 11, wherein the means for identifying candidate locations for the floating vias further comprising means for comparing two consecutive routing layers and means for obtaining open areas that are common to both layers.

13. The apparatus of claim 11, wherein the candidate locations are ordered based at least in part upon an estimate of effects upon the design.

14. The apparatus of claim 11, wherein means for identifying the candidate locations for the non-floating vias further comprising means for comparing two consecutive routing layers and means for obtaining open areas on one layer and nets on the other that are common.

15. The apparatus of claim 10, wherein the non-floating vias are added to establish the via filling parameter requirement prior to adding the floating vias.

16. The apparatus of claim 9, wherein the via filling parameter comprises a cut density or a spacing distance.

17. A computer program product comprising a volatile or non-volatile computer usable medium having executable code to execute a process using a processor for locating via filling, the process comprising:
   establishing a window to check for a via filling parameter within a particular section of a design;
   determining whether the via filling parameter within the window meets a via filling parameter requirement; and
   adding by a processor one or more additional via fills if the via filling parameter requirement is not met, wherein the act of adding the one or more additional via fills comprises adding additional vias to the design until a density requirement of cuts for the window has been met; and
   storing the added one or more additional vias or displaying the added one or more additional vias on a display device.

18. The computer program product of claim 17, wherein the one or more additional vias comprises floating and/or non-floating vias.

19. The computer program product of claim 18, further comprising identifying candidate locations eligible for adding the one or more vias until the via filling parameter requirement is met.

20. The computer program product of claim 19, wherein the candidate locations for the floating vias are determined by comparing two consecutive routing layers and obtaining open areas that are common to both layers.

21. The computer program product of claim 19, wherein the candidate locations are ordered based at least in part upon an estimate of effects upon the design.

22. The computer program product of claim 19, wherein the candidate locations for the non-floating vias are determined by comparing two consecutive routing layers and obtaining open areas on one layer and nets on the other that are common.

23. The computer program product of claim 18, wherein the non-floating vias are added to establish the via filling parameter requirement prior to adding the floating vias.

24. The computer program product of claim 17, wherein the via filling parameter comprises a cut density and/or a spacing distance.

* * * * *